June 14, 1927. 1,632,629
E. M. SHANNON
CYLINDRICAL VALVE FOR LOCOMOTIVES
Filed July 5, 1924 2 Sheets-Sheet 1

Inventor.
Ellwood M. Shannon.
by his Attorneys.

June 14, 1927.
E. M. SHANNON
1,632,629
CYLINDRICAL VALVE FOR LOCOMOTIVES
Filed July 5, 1924 2 Sheets-Sheet 2
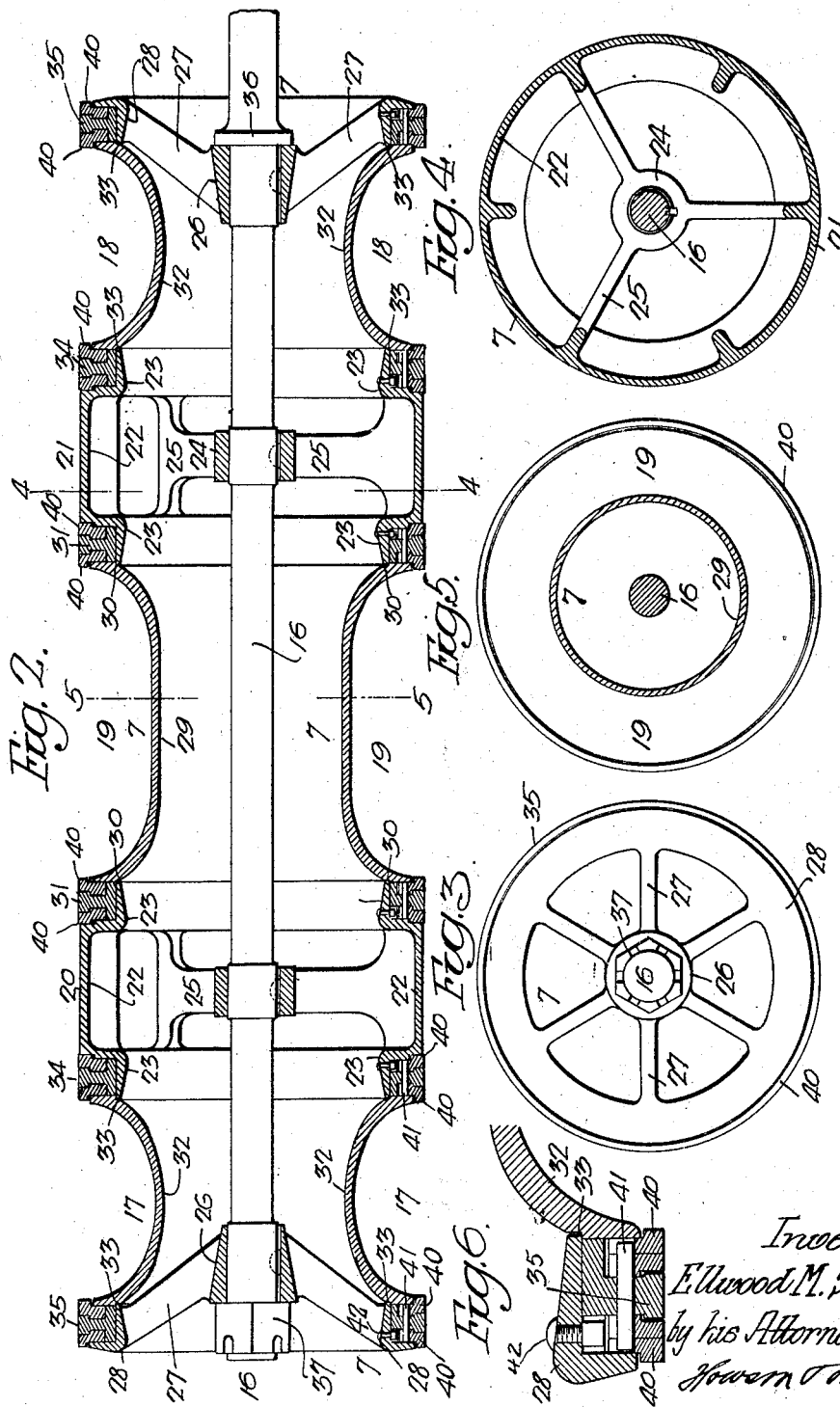
Inventor:-
Ellwood M. Shannon,
by his Attorneys Patented June 14, 1927.

1,632,629

UNITED STATES PATENT OFFICE.

ELLWOOD M. SHANNON, OF BALA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

CYLINDRICAL VALVE FOR LOCOMOTIVES.

Application filed July 5, 1924. Serial No. 724,464.

My invention relates to certain improvements in cylindrical valves used in connection with locomotive cylinders of the type having inlet ports and passages separate from the exhaust ports and passages.

The object of the invention is to make the valve of a series of sections, which are coupled together by a rod that extends through the sections of the valve and to provide packing rings at the junction of the several sections.

In the accompanying drawings:

Fig. 2 is an enlarged longitudinal sectional view of the valve;

Fig. 3 is an end view;

Fig. 4 is a sectional view on the line 4—4, Fig. 2;

Fig. 5 is a sectional view on the line 5—5, Fig. 2; and

Fig. 6 is an enlarged sectional view of a portion of Fig. 2, showing the detail construction of the packing rings.

Figure 1:
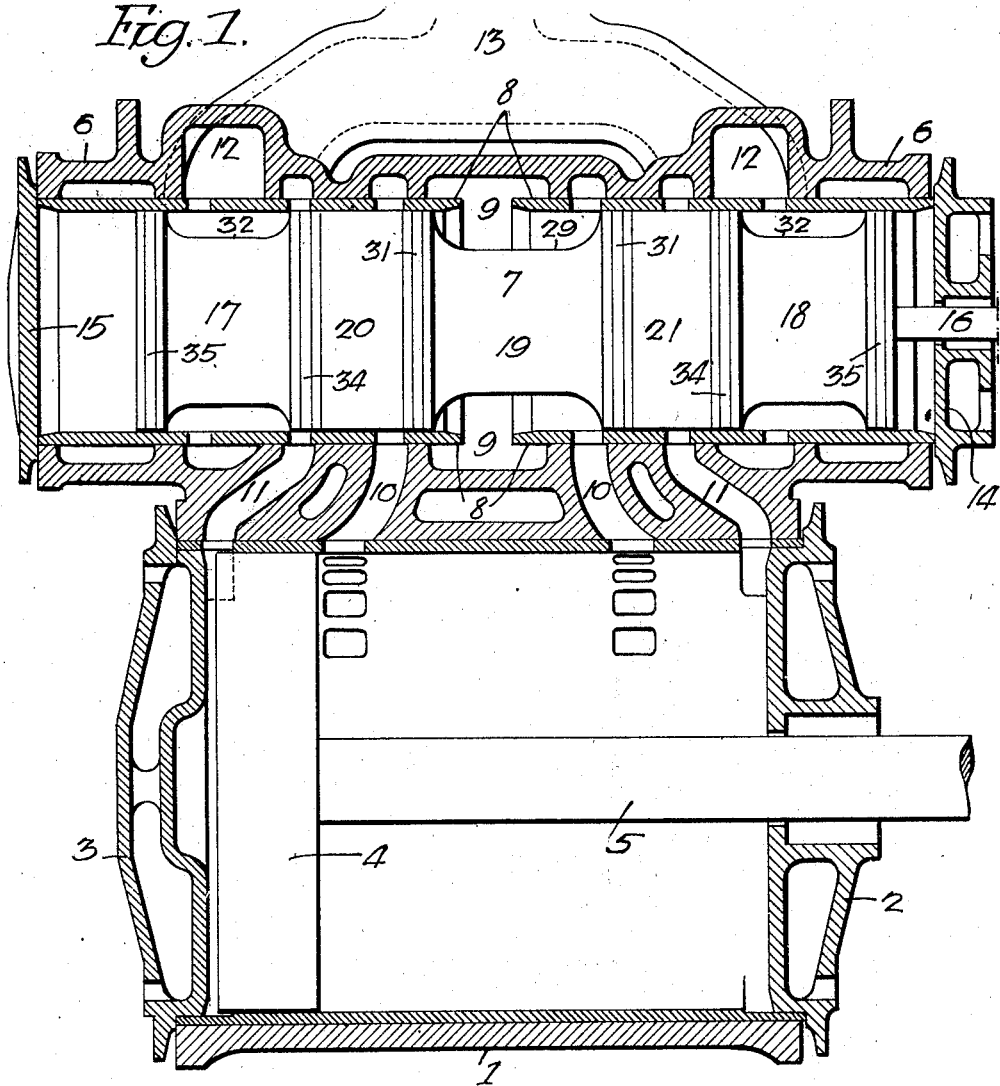
Fig. 1 is a sectional elevation of a sufficient portion of a cylinder and valve chest of a locomotive to illustrate my improved cylindrical valve.

Referring to the drawings, 1 is the cylinder of a locomotive having heads 2 and 3. Within the cylinder is a piston 4 having a rod 5 that extends from a stuffing box in the head 2. Cast integral with the cylinder, in the present instance, is a valve chest 6, which is cylindrical in cross section. Fitting in the valve chest is a cylindrical valve 7. The valve chest has cylindrical bushings 8, which extend from each end to a point near the center. The bushings are separated to allow the exhaust passage 9 to communicate with the interior of the valve chest.

At each side of the central exhaust passage 9 are exhaust passages 10, which communicate with the cylinder at a point between the center of the cylinder and each end thereof and with the valve chest on each side of the exhaust passage 9. Communicating with each end of the cylinder are inlet passages 11 for live steam, which also communicate with the valve chest some distance from the exhaust passages 10. Surrounding the valve chest at each end thereof beyond the inlet passage 11 is a steam supply passage 12. The two passages communicate with a central steam supply passage 13, which, in turn, communicates with the steam pipe leading from the boiler or the superheater.

The bushings 8 are perforated at the several ports for the free flow of the live steam and the exhaust steam. The ends of the valve chest are closed by heads 14 and 15. The valve rod 16 extends through the head 14, as shown clearly in Fig. 1. The valve 7 has three annular steam spaces 17, 18 and 19, which are separated by blank sections 20 and 21. The two spaces 17 and 18 are for the passage of live steam from the steam passages 12 to the passages 11 leading to the cylinder. The space 19 is for the passage of exhaust steam from the passages 10 to the central exhaust passage 9. The valve 7 consists of a series of sections that are secured together by the valve rod 16, which extends entirely through the valve, as shown clearly in Fig. 2.

The sections 20 and 21 of the valve each have a central portion 22 and depressed flanges 23 at each side. Each section has a central hub 24, which is connected to the central portion 22 by webs 25. The rod 16 has its bearing in the hub 24. At the respective ends of the valve are spiders, each of which comprises an annular hub 26. The valve-rod extends through the two hubs. Rings 28 correspond to the side flanges of the sections 20 and 21. Between the sections 20 and 21 is a cylindrical spacer section 29, which is less in diameter at the center than at the ends, which forms the exhaust steam space 19. This section is made preferably of boiler steel flanged to the form shown in Fig. 2. It is notched at 30 to receive the ends of the flanges 23 of the sections 20 and 21. Between the cylindrical section 29 and the sections 20 and 21 are retaining rings 31, shaped as shown in the drawings. Each of the rings 31 has a wide base which contacts directly with the spacer section 29 and the corresponding valve section, and each of the rings has undercut recesses at opposite sides thereof adapted to receive snap-rings, as hereinafter set forth. The shape of the rings 31 may vary depending upon the type of packing employed.

The cylindrical spacing sections 32, which are shaped to form the annular steam spaces 17 and 18, are made similar to the section 29 and are notched at 33 to receive the ends of the flanges 23 of the sections 20 and 21 and the flanged portion of the rings 28.

Between the sections 32 and the sections 20 and 21 are retaining rings 34. Between the sections 32 and the end rings 28 are retaining rings 35. The rings 34 and 35 are similar to the rings 31 already described.

The rod 16 has a shoulder 36 against which the hub of the forward spider rests and the opposite end of the rod is used for the reception of a nut 37. On tightening this nut, the sections of the valve are drawn close together, as shown in Fig. 2.

In order to lock the sections 20 and 21 and the end hubs 26 to the rod 16, keys are provided, as shown in the drawings.

In the present instance, the packing rings between the several sections are made as shown in Fig. 6. The central ring 35 has an extended base, which fits the recess between the two sections. On each side of this central ring are snap rings 40, which fit the undercut recesses of the ring 35. The ring 35 is secured against rotation by means of a threaded screw 42, and the rings 40 are coupled to the central ring 35 by a dowel pin 41.

I claim:

The combination in a cylindrical valve, of a valve rod, two pairs of spiders, the spiders of each pair comprising an outer ring and a central hub; packing rings mounted on the outer rings; a central cylindrical section located between the intermediate spiders; two cylindrical end sections between the said intermediate spiders and the end spiders, said cylindrical end sections being less in length than the central section; and means on the rod for clamping the series of parts together, said cylindrical sections and spiders forming a valve having a central passage therein extending from one end of the valve to the other.

ELLWOOD M. SHANNON.